US006434161B1

(12) United States Patent
Higbee et al.

(10) Patent No.: US 6,434,161 B1
(45) Date of Patent: *Aug. 13, 2002

(54) UART WITH DIRECT MEMORY ACCESS BUFFERING OF DATA AND METHOD THEREFOR

(75) Inventors: Brent C. Higbee, Taylorsville; Gerald A. Wilson, South Jordan; Garn H. Morrell, Kaysville; Spiro Poulis, Kearns, all of UT (US)

(73) Assignee: 3Com Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/030,077

(22) Filed: Feb. 25, 1998

(51) Int. Cl.[7] .............................................. H04L 12/56
(52) U.S. Cl. ....................... 370/413; 370/419; 370/429; 370/463; 709/249; 375/222
(58) Field of Search ................................ 370/362, 363, 370/368, 371, 379, 412, 413, 419, 230, 420, 463, 429, 428; 375/220, 222; 395/800, 825; 709/235, 249

(56) References Cited

U.S. PATENT DOCUMENTS

| 5,287,534 A | | 2/1994 | Reuther et al. ............. 395/800 |
|---|---|---|---|
| 5,291,614 A | | 3/1994 | Baker et al. ................ 395/800 |
| 5,386,438 A | | 1/1995 | England ..................... 375/121 |
| 5,402,518 A | * | 3/1995 | Lowery ...................... 704/201 |
| 5,408,614 A | | 4/1995 | Thornton et al. ........... 395/275 |
| 5,450,530 A | * | 9/1995 | Snyder et al. .............. 375/220 |
| 5,864,710 A | * | 1/1999 | Sands et al. ................ 395/825 |
| 5,909,193 A | * | 6/1999 | Phillips et al. ............. 342/410 |
| 5,923,709 A | * | 7/1999 | Keel et al. .................. 375/257 |
| 5,931,950 A | * | 8/1999 | Hsu et al. ................... 713/300 |
| 6,065,131 A | * | 5/2000 | Andrews et al. ........... 713/600 |
| 6,122,693 A | * | 9/2000 | Gutta et al. ................ 710/107 |
| 6,185,628 B1 | * | 2/2001 | Sands et al. .................... 710/5 |
| 6,195,359 B1 | * | 2/2001 | Eng et al. ................... 370/401 |
| 6,212,566 B1 | * | 4/2001 | Vanhoof et al. ........... 709/230 |

* cited by examiner

Primary Examiner—Hassan Kizou
Assistant Examiner—Saba Tsegaye
(74) Attorney, Agent, or Firm—Workman & Nydegger & Seeley

(57) ABSTRACT

An apparatus and method for transferring data between a host system and a communication network via a communication module wherein the communication module presents a UART-like interface to the host system. The communication module is comprised of an emulated UART module, a digital signal processor (DSP), and a DSP memory. The emulated UART provides a compatible UART-like front end for interfacing directly with a host system and additionally performs direct memory access-like (DMA) functions enabling the direct transfer of transmit data between the host system and DSP memory that is directly accessible by the DSP for modulation and/or other processing such as data compression. The emulated UART module additionally provides performance features such as adjustable buffering quantity thresholds for triggering interrupts to either the host system or DSP, and pacing features that provide the host system with the appearance and performance of a serialized UART.

21 Claims, 5 Drawing Sheets

UART WITH DIRECT MEMORY ACCESS BUFFERING OF DATA AND METHOD THEREFOR

BACKGROUND OF THE INVENTION

1. The Field of the Invention

The present invention relates to the field of data transmitting and receiving interface devices and methods. More particularly, the present invention relates to a system and method for directly transferring data between a host system, such as a personal computer, and a digital signal processor for performing, among other things, modulation/demodulation.

2. Present State of the Art

With the advances and the ubiquitous nature of computer and telephone communication systems requiring expanded data transfer and processing capabilities, there is a continuing demand for improving the transfer of data from a host system such as a computer system, to a communication network such as a telephone infrastructure, via a communication module. For example, the increased transfer of voice, sound, and image data over networks such as the Internet require high speed data processing capabilities at very high data transfer rates. Such advanced technological requirements place demands on hardware and software components and require efficient processing and transport of data through such interfacing communication modules.

A conventional communication module implementation generally includes a modem (modulator/demodulator) operably coupled with a host system such as a computer. The host system provides the user interface for the generation or consumption (viewing, hearing, or storing) of transfer data by a user of the host system. Prior art configurations have connected host systems with a communication module such as a modem via a serial or parallel port or interface.

A traditional communication module such as a modem may include a standard Universal Asynchronous Receiver/Transmitter (UART) or UART emulator in which the format of data is converted. A UART device essentially converts data between parallel and serial formats depending upon whether the host system is transmitting or receiving data. Data on the host system is stored and operated upon in parallel form and must therefore be converted to serial form for transmission from the host system into the communication network.

FIG. 1 represents a prior art configuration of network interface configuration 100 comprising a host system 102, a UART 106, and a modem 120 for interfacing with communication network 128. Host system 102 is further comprised of a host bus 104 which is traditionally a parallel interface for support devices such as processors, memory, and other peripheral devices such as UART 106. UART 106 traditionally interfaces with host system 102 via host bus 104 and receives data for transmission in parallel form as represented by transmit path 108. UART 106 also provides received data to host system 102 in parallel form as represented by receive path 110. Status and control information (e.g., status regarding whether transmit data has been forwarded or whether pending receive data is awaiting retrieval by host system 102) are also provided by UART 106 in control registers 118 as represented by control path 112. Data interfacing outside UART 106 traditionally occurs via a serial port 122, and in many personal computers, UART 106 is internally housed and presents a serial COM port for interfacing with serial peripherals.

In FIG. 1, the primary function of modem 120 is to allow the transmission and reception of data over a telephone medium such as communication network 128. Modem 120 traditionally comprises a UART 124 and a DSP 126. UART 124 reconverts transmit data back from serial format to parallel format for processing by DSP 126. UART 124 also converts receive data from parallel to serial for transferring to UART 106. DSP 126 provides modulation and demodulation of data for transceiving over channel 130 with communication network 128. Transceived waveforms comprise analog waveforms which are modulated and demodulated for carrying data over communication network 128.

Traditional UARTs in a modem device typically process data in block mode and when processing is completed such as transmission of transmit data or receipt and demodulation of receive data, an interrupt is sent to the host system or, alternatively, a status is posted in a control register which may be polled by the host system to signify a request for the transfer of additional data or to inform the host system to retrieve the available data. By way of example, a 1-byte UART would transfer a single byte of data for each interrupt request or status posted and reacted upon. UARTs operate, for example in a transmit mode, by transferring a parallel byte over the host bus to a holding register from which it may be serially transferred. When the holding register becomes empty, a subsequent interrupt invites the host system to transfer an additional byte of data.

Advances in the UART art created a conventional UART having a plurality (i.e., usually 16) buffers which operate as First In First Out (FIFO) buffers (e.g., transmit buffers 114, and receive buffers 116 both of FIG. 1) providing interim storage of additional bytes of data prior to initiating an interrupt to the host system. Further advances in the prior art resulted in UART emulation wherein UART 106 and modem 120 were effectively combined into a single function and the conversion of parallel data present in UART 106 into serial data for transmission between UART 124 over serial port 122 was discontinued. It should be recognized that if UART 106 and modem 120 are merged, serialization of transferred data becomes unnecessary. Although serialization in a merged architecture is abrogated, the merged configuration must still present a UART-appearance to host system 102 to retain compatibility with existing drivers and control functions pertaining to the transfer of data between host system 102 and communication network 128.

Conventional UARTs may be adequate for lower data rate transfers of information, however, as transmission data rates increase due to increased bandwidth appetites, piecemeal transfers of data between a host system and a communication module such as a modem become increasingly more burdensome upon host systems that become expected to service interrupt requests nearly incessantly for what have become typical data transfers over communication network 128. Depending upon the particular software applications being concurrently serviced by the host system, the host system may not have sufficient time to service all of the processing interruptions requested by peripherals.

Additionally, significant latency is introduced in transfers of data between a host system and communication network by any required interim handling of data. As discussed above, traditionally, data passed in parallel form from a host system to holding registers in a UART. These holding registers were then in turn serviced internally by the UART whereupon the data in the registers were serially transferred to another holding register of the modem's UART. The modem's UART needed to retain the data until such data was directly requested by the DSP or until such data may be again transferred to a holding memory accessible by the DSP. Only after the holding registers were serviced by the passing of the data through the stages of the data pipeline, could subsequent data enter the pipeline from the host system. The continuous shuffling of data among intermediate holding registers degradates performance throughput of a communication module because of iterative shifting and relocation of transmit or receive data.

Thus, it is desirable to maximize the data transfer rate between a host system and a communication network via a communication module and further to minimize or control the interruptions to the host system in servicing such data transfers.

SUMMARY AND OBJECTS OF THE INVENTION

It is, therefore, an object of the present invention to provide a data communication module for transceiving data between a host system and a communication network that is capable of directly transferring or queuing transmit data from the host system to the DSP's memory and for providing access by the host system to receive data upon completion of processing (e.g., demodulation) by the DSP.

Another object of the present invention is to accommodate the defining of the frequency of interruption to the host system by the communication module.

Yet another object of the present invention is to provide a communication module that complies with or presents the compatible appearance to the host system of a traditional UART.

Still another object of the present invention is to provide an emulated UART for directly facilitating the transfer of data between the host system and the DSP providing processing of signals for a communication network.

Still yet another object of the present invention is to provide a method for asynchronously transceiving data between a host system and a communication network without introducing latency due to relocation of data in a communication module.

Additional objects and advantages of the present invention will be set forth in the description which follows, and in part will be obvious from the description, or may be learned by the practice of the invention. The objects and advantages of the invention may be realized and obtained by means of the instruments and combinations particularly pointed out in the appended claims.

To achieve the foregoing objects, and in accordance with the invention as embodied and broadly described herein, a method and communication module for asynchronously transmitting transmit data and receiving receive data between a host system and a communication network is provided.

The method is performed by and the communication module is comprised of an emulated UART which provides an efficient conduit between: a host system, a digital signal processor (DSP) which provides modulation/demodulation services, and a DSP memory. In the present invention, transceiver buffers comprised of individual transmit and receive buffers are initialized within the DSP memory by defining read and write pointers in addition to buffer boundaries.

When a host system possesses transmit data, such transmit data is queued directly from a host system to a transmit buffer in a DSP memory. The emulated UART facilitates Direct Memory Access-like (DMA) transfer of transmit data directly from the host system to the transmit buffers resident within the DSP memory. Processing of the transmit data then proceeds with the DSP performing modulation, and optionally data compression, followed by transmission of the processed transmit data.

When a DSP receives previously processed (i.e., modulated and optionally data compressed) receive data, the DSP processes such data and stores or queues the receive data in the receive buffer of the DSP memory. When a quantity of receive data exceeds a definable threshold level, the emulated UART notifies the host system either through the use of interrupts or by posting a status in a control register that may be polled by the host system. When requested by the host system, the emulated UART directly transfers the receive data from the DSP memory to the host system.

These and other objects and features of the present invention will be more fully apparent from the following description and appended claims, or may be learned by the practice of the invention as set forth herein.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

As used in the specification, the phrase "emulated UART" refers to a functional module inclusive of hardware, firmware, or software for presenting a UART-like interface to a host system while facilitating/performing data transfers with a DSP.

As used in the specification, the term "host system" refers to a processing unit such as a computer, personal computer, or other logic executing device comprising hardware and/or software for transferring data or information.

Figure 2:
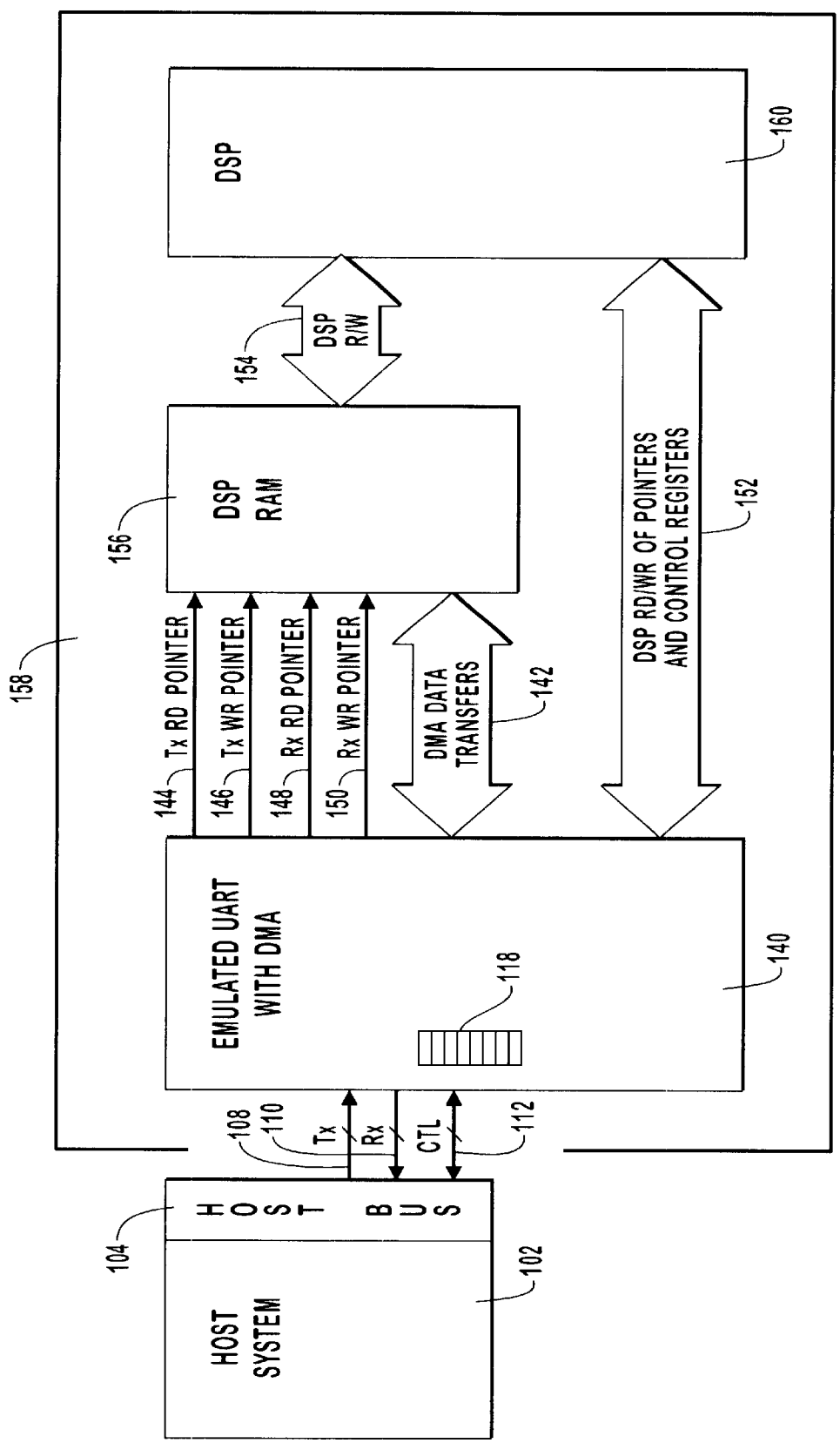
FIG. 2 is a block diagram of a configuration for transferring data between a host system and a communication network, in accordance with a preferred embodiment of the present invention.

FIG. 2 is a block diagram of a configuration for transferring data between a host system and a communication network, in accordance with a preferred embodiment of the present invention. A host system 102 generally takes the form of a personal computer and may provide a user interface (not shown) for the generation or consumption of data. Host system 102 also includes a host bus 104 for accommodating a standardized interface for other peripheral components. Host bus 102 may take the form of ISA, EISA, PCMCIA, VME, PCI, CardBus, NuBus, or other bus interface standards known by those of skill in the art. Host bus 104 facilitates the exchange of transmit data, receive data, and control data via what are illustrated as logical channels in FIG. 2 and designated as transmit path 108, receive path 110, and control path 112, respectively. Paths 108, 110, and 112, in the preferred embodiment, are implemented as read/write operations over a bi-directional data bus portion of host bus 104. Control path 112 may be implemented as status registers 118 containing flags designating present status or states, for example, as ready/not-ready for additional transmit data, receive data present/not-present, etc. Alternatively, control path 112, in an alternate embodiment, may be implemented partially or entirely as an interrupt structure presenting control status directly to host system 102.

Figure 1:
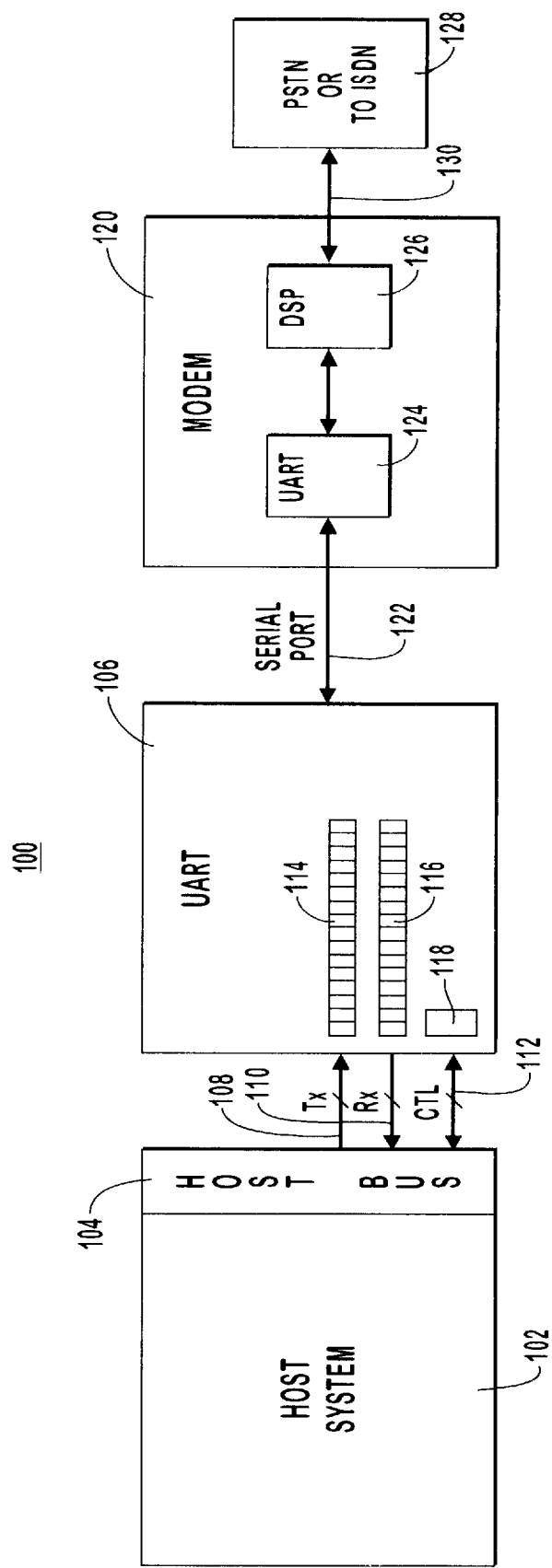
FIG. 1 is a block diagram of a prior art communication configuration for transferring data between a host system and a communication network.

An emulated UART 140 operably couples to host system 102 via host bus 104 as a peripheral to host system 102. Emulated UART 140 need not be external to host system 102 and, in the case where host system 102 takes the form of a personal computer, emulated UART 140 frequently is physically located within host system 102 as part of a communication module/card assembly 158. Emulated UART 140 is not implemented as a traditional hardware FIFO having a series of resident buffers as described in FIG. 1, but rather is implemented, in the preferred embodiment, as a combination of hardware and firmware which implements a Direct Memory Access-like (DMA) transfer of transmit and receive data directly between host system 102 and directly-accessible DSP memory 156 of a DSP 160. By directly transferring data between the host system and DSP working memory via a DMA data path 142, iterative transfers and latency associated with interim buffering is reduced and, therefore, less burden is placed upon the DSP in retrieving and relocating transmit and receive data.

Additionally, modern data processing techniques, such as compression encoding, require appreciable sized blocks that often exceed traditional FIFO sizes of prior art configurations. Significant performance improvements are noted by providing both DMA of transmit/receive data and larger buffering of transmit data in DSP-operable storage (i.e., the working space in the DSP memory can serve as the actual working buffer for the DSP without requiring additional transfers from the DMA working block to another block within the DSP memory).

A DSP memory 156 operably couples, in the preferred embodiment, with both emulated UART 140 providing DMA control and DSP 160. DSP memory 156 preferably takes the form of a high-speed memory device such as a Static-RAM (SRAM) having access times conducive with the high execution rates of modern DSPs. DMA transfers between host system 102 and DSP memory 156 are coordinated by four data pointers, two for each direction of data transfer: TX Read Pointer 144, TX Write Pointer 146, RX Read Pointer 148, and RX Write Pointer 150.

Transmit data transfers from host system 102 to DSP memory 156 is accomplished by using DMA techniques (as disclosed above) to transfer data to and from the DSP's working memory. Two pointers are used as place holders in a circular queue implemented in DSP memory 156 (FIG. 4) with one providing the write address and one providing the read address. The relative position of these pointers determines how much data is in the circular queue (FIFO) as well as providing a method for detecting a buffer overflow condition. The value of TX Write Pointer 146 is maintained by emulated UART 140 and the value of TX Read Pointer 144 is maintained by DSP 160. The values of both pointers are visible to both emulated UART 140 and DSP 160.

DMA transfer of transmit data, in the preferred embodiment, commences with emulated UART 140 receiving a byte of transfer data from host system 102 via host bus 104. Emulated UART 140 asserts a HOLD signal via control path 152 to DSP 160. When DSP 160 completes its current task, DSP 160 asserts a HOLD ACKNOWLEDGE via control path 152 to emulated UART 140 whereupon the transmit data is written into DSP memory 156 via data path 142. Upon the completion of the write operation, emulated UART 140 deasserts the HOLD signal and the DSP regains control of DSP memory 156. In order to maintain throughput performance from host system 102, emulated UART 140 may implement a double buffer (not shown) allowing the host system to write a byte of data during the completion of DSP processing following the assertion of the HOLD signal but prior to the receipt of the HOLD ACKNOWLEDGE signal. Such buffering provides a transparent appearance to the host system thus ensuring minimal delays to the host system.

A DMA transfer of receive data from DSP memory 156 to host system 102 also occurs via emulated UART 140. Queuing of data is performed as described above with the control of the pointers being reversed (i.e., DSP 160 controls the value of RX Write Pointer 150 and emulated UART 140 controls RX Read Pointer 148). Emulated UART 140 monitors the size of the queue (FIG. 4) and monitors for an overrun condition by the differential of the pointer values. A buffer quantity threshold is evaluated by emulated UART 140 in making a determination of when and how frequently to interrupt or notify host system 102 of the presence of receive data. The buffer quantity threshold, in the preferred embodiment, is programmed into emulated UART 140 via control path 152 by DSP 160 upon initialization of the transmit and receive buffers (FIG. 4) of DSP memory 156. When the quantity of receive data in the receive buffer exceeds the quantity threshold, emulated UART 140 then generates, in the preferred embodiment, an interrupt notifying or prompting host system 102 to read the receive data thus vacating the receive buffer. In an alternate embodiment, emulated UART 140 may post a status signifying the presence of receive data in the receive buffer of DSP memory 156, such status may be posted in control registers 118 which may be periodically polled by host system 102. When receive data is read by host system 102, emulated UART 140 exercises the DMA signalling (e.g., HOLD and HOLD ACKNOWLEDGE) as disclosed above in the description of the transmit cycle.

Figure 3:
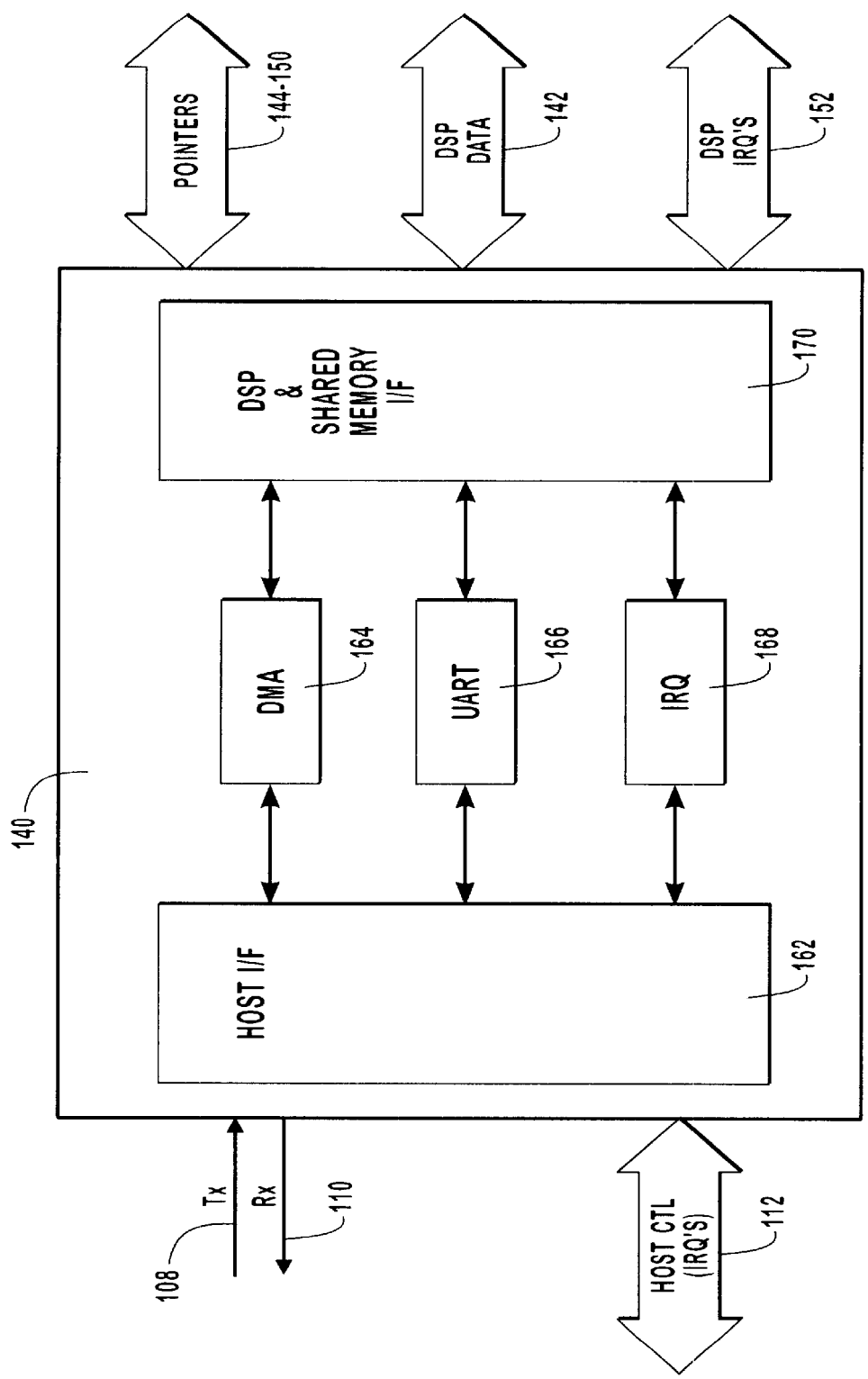
FIG. 3 is a block diagram of an emulated UART for providing direct transfer of data between a host system and transceiver buffers within a DSP memory, in accordance with a preferred embodiment of the present invention.

FIG. 3 is a block diagram of an emulated UART for providing direct transfer of data between a host system and transceiver buffers within a DSP memory, in accordance with a preferred embodiment of the present invention. A host interface block 162 operably couples to host bus 104 (FIG. 2) and provides compatible interfacing of emulated UART 140 with applicable bus standards. Host interface 162 is additionally mapped into the host system's addressable address space enabling data transfers therebetween. Additionally, host interface 162, in conjunction with operably coupled UART block 166, provides mappable control registers for providing a UART-compatible appearance to host system 102. UART block 166, in an alternate embodiment, accommodates a pacing function wherein emulated UART 140 provides the appearance to host system 102 of a "serialized" UART having a perceivable "delay" representative of serially shifting the parallelly received data to the DSP. Such a pacing feature facilitates host system applications that rely upon a paced communication module, thus preserving the execution aesthetics of the software applications.

A DMA block 164 operably couples to host interface block 162 and provides the aforementioned functionality of facilitating data transfers directly between host bus 104 and DSP memory 156. Functions resident within DMA block 164 include generation of the HOLD signal via control path 152 to DSP 160, and evaluation of the HOLD ACKNOWL- EDGE signal as sent from DSP 160 for signifying the passing of control of DSP memory 156 to emulated UART 140.

An IRQ block 168 facilitates the notification of host system 102 regarding the presence of receive data in the receive buffer of DSP memory 156. Additionally, in an alternate embodiment, when receive data arrives at the communication module in small blocks or when fragments of blocks remain in the receive buffer that are insufficient in quantity to exceed the quantity threshold necessary to invoke an interrupt to host system 102, a stale data time invokes an interrupt to request that the data be immediately read out of the buffers.

The DSP and share memory interface block 170 operatively couples with both DSP memory 156 and DSP 160 to facilitate DMA functions and provide initialization of emulated UART functions such as setting of threshold levels, and configuring transmit and receive buffers within DSP memory 156.

Figure 4:
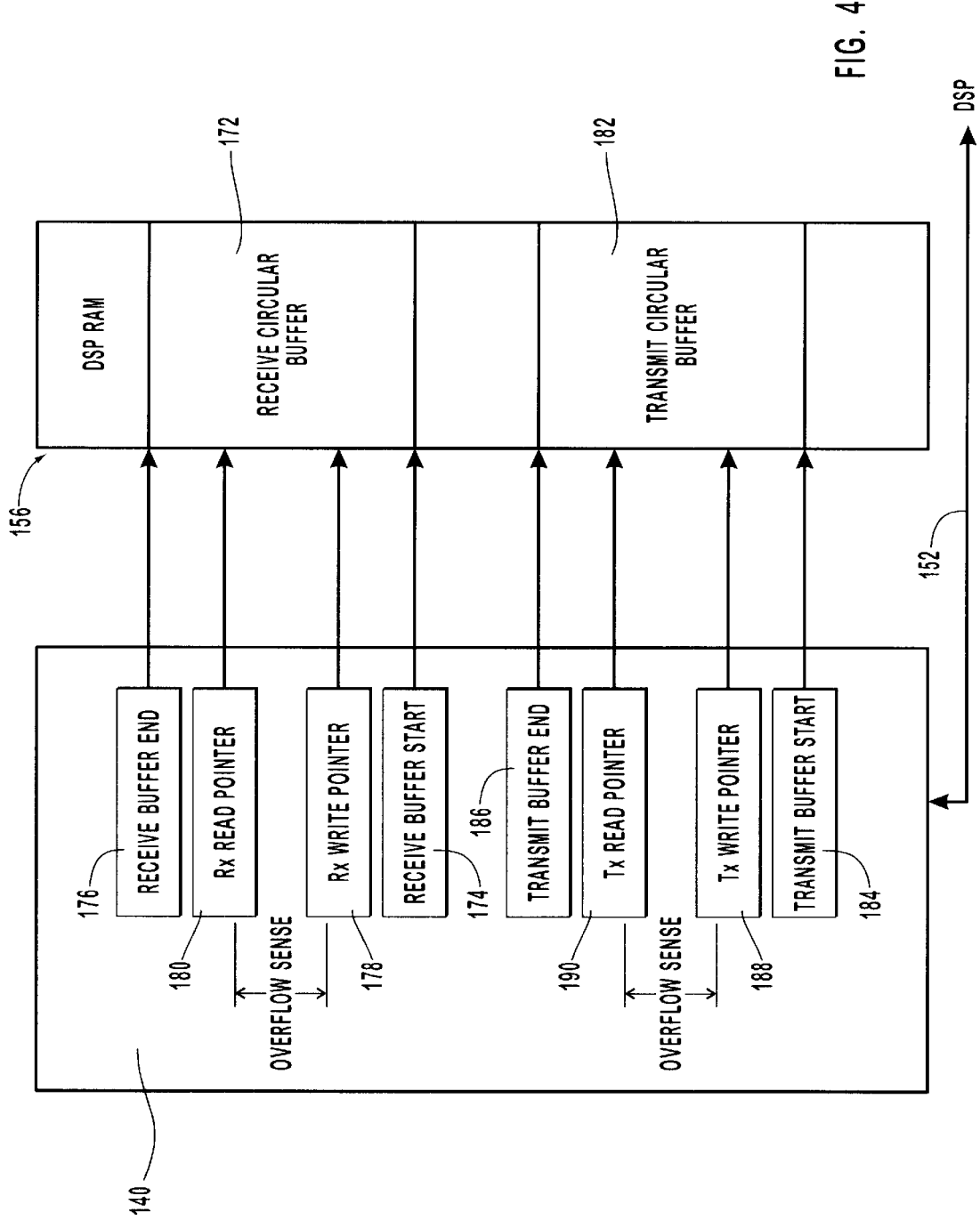
FIG. 4 is a structural diagram of a partitioned DSP memory for accommodating transmit and receive buffers, in accordance with a preferred embodiment of the present invention.

FIG. 4 is a structural diagram of a partitioned DSP memory for accommodating transmit and receive buffers, in accordance with a preferred embodiment of the present invention.

A transmit buffer 182 is partitioned within DSP memory 156 and is delineated by a transmit buffer start 184 and a transmit buffer end 186. Transmit buffer 182, in the preferred embodiment, provides a circular buffer for storage of transmit data as transferred directly from host system 102. A TX Write Pointer 188 is managed by emulated UART 140 and is advanced upon the completion of a byte transfer from host system 102 to transmit buffer 182. A TX Read Pointer 190 is managed by DSP 160 and recedes with each subsequent read from transmit buffer 182 by DSP 160.

A receive buffer 172 is partitioned within DSP memory 156 and is delineated by a receive buffer start 174 and a receive buffer end 176. Receive buffer 172, in the preferred embodiment, provides a circular buffer for storage of receive data as transferred from DSP 160 for immediate delivery to host system 102. A RX Write Pointer 178 is managed by DSP 160 and is advanced upon the completion of a byte transfer from DSP 160 to receive buffer 172. A RX Read Pointer 180 is managed by emulated UART 140 and recedes with each subsequent read from receive buffer 172 by host system 102.

It should also be noted that all of the pointers may be read by either emulated UART 140 or DSP 160 even though only TX Write Pointer 188 and RX Read Pointer 180 may be altered by emulated UART, and likewise, TX Read Pointer 190 and RX Write Pointer 178 by DSP 160. Also, either or both emulated UART 140 and DSP 160 may monitor the differential between the Read and Write Pointers to determine or sense the proximity of an overflow condition, thus enabling either to redress the condition.

Figure 5:
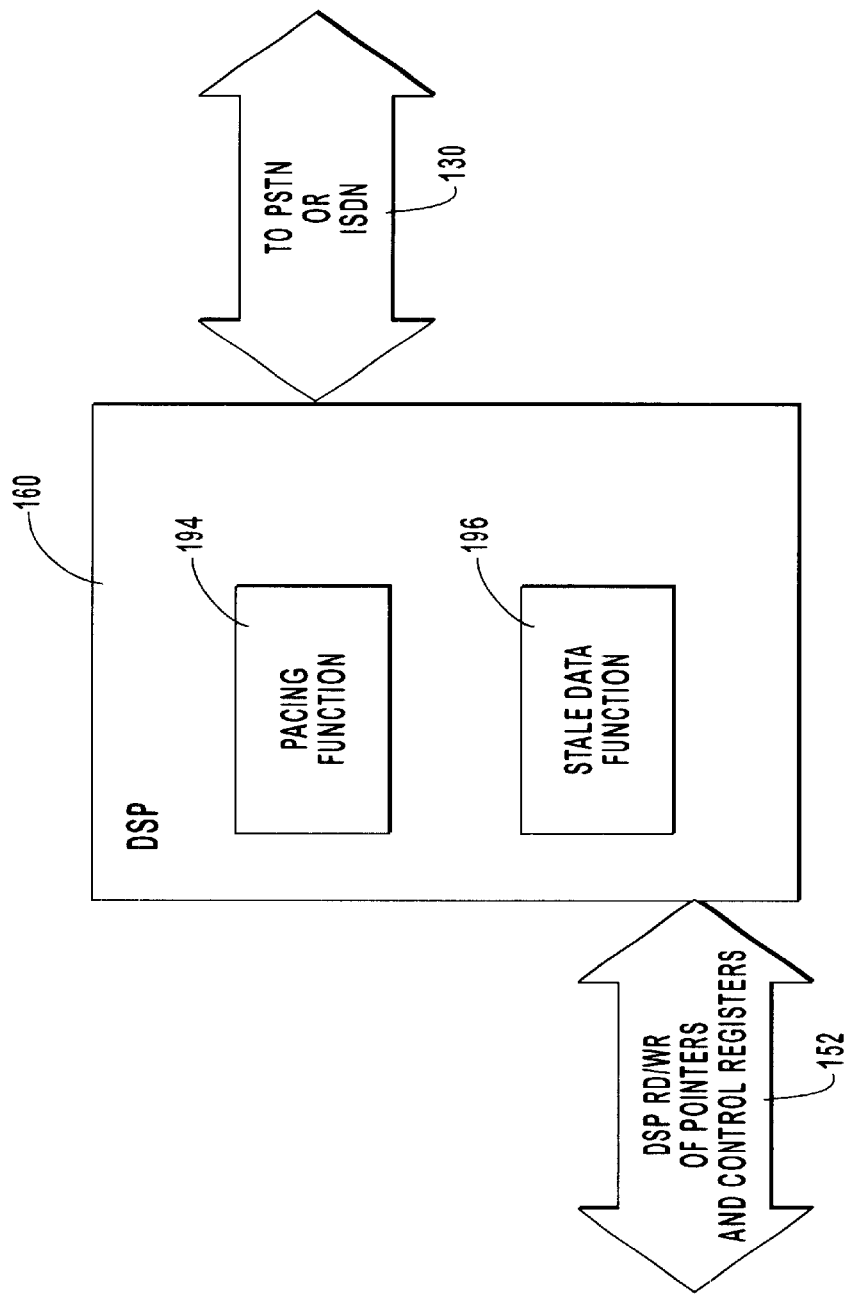
FIG. 5 is a functional block diagram of a DSP comprising augmented functionality, in accordance with a preferred embodiment of the present invention.

FIG. 5 is a functional block diagram of a DSP comprising augmented functionality, in accordance with a preferred embodiment of the present invention.

DSP 160 performs special functions in conjunction with emulated UART to execute the transfer of data between host system 102 (FIG. 2) and DSP memory 156. Such features are represented by a Stale Data Function 196, and Pacing Function 194.

Stale Data Function 196, in the preferred embodiment, is carried out by stale transmit and stale receive registers within emulated UART 140 that are initialized by DSP 160. Interrupts are then generated by emulated UART 140 and sent to DSP 160 when transmit data becomes stale in transmit buffer 182 (FIG. 4) or when receive data becomes stale in receive buffer 172 (FIG. 4), an interrupt is generated and sent to host system 102.

The pacing function of emulated UART 140 provides the appearance of a "serialized" UART for interfacing with host systems that require time-spaced interrupts in order to maintain certain speed requirements. To provide this appearance to the host system, interrupts are paced as they would be if the data were serialized through a shift register. In order to provide flexibility, DSP 160 via Pacing Function 194 may set the pacing value by writing to a pacing register within emulated UART 140. In the preferred embodiment, the pacing value loads a counter and may control pacing in both directions of data transfers (i.e., the dispatch of both transmit data and receive data).

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. data communication module for asynchronously transceiving transmit and receive data between a host system and a modem interfacing with a communication network, said module comprising:
   a) a DSP memory partitioned into transmit and receive buffers for directly storing said transmit and receive data;
   b) an emulated UART for directly interfacing with said host system and for utilizing said DSP memory for buffering between said modem and said host system, said emulated UART electrically coupled to said DSP memory for directly queuing said transmit data to said transmit buffer, for notifying said host system of said receive data when a quantity of said receive data in said receive buffer exceeds a threshold, and for transferring said receive data upon request to said host system, said emulated UART further comprising:
      (i) a means for receiving said transmit data from said host system;
      (ii) a means for temporarily suspending a DSP from accessing said DSP memory; and
      (iii) a means for forwarding said transmit data to said DSP memory; and
   c) said DSP electrically coupled to said DSP memory for interacting with said communication network, initializing said transmit and receive buffers within said DSP memory, and both processing and transmitting said transmit data directly from said DSP memory to the communication network, and receiving and processing said receive data from said communication network.

2. The data communication module as recited in claim 1 wherein said DSP further comprises:

(a) a means for defining a transmit buffer comprising transmit read and transmit write pointers; and
(b) a means for defining a receive buffer comprising receive read and receive write pointers.

3. The data communication module as recited in claim 2 wherein said DSP further comprises a means for programming said transmit and receive buffers.

4. The data communication module as recited in claim 1 wherein said emulated UART further comprises a means for prohibiting said host system from transferring said transmit data when said transmit buffer is full.

5. The data communication module as recited in claim 4 wherein said emulated UART further comprises a means for pacing the rate of transfer of said transmit data from said host system.

6. The data communication module as recited in claim 1 wherein said DSP further comprises a means for modulating said transmit data.

7. The data communication module as recited in claim 6 wherein said DSP further comprises a means for data compressing said transmit data.

8. The data communication module as recited in claim 1 wherein said emulated UART further comprises a means for interrupting said host system upon the presence of a quantity of said receive data in said receive buffer.

9. The data communication module as recited in claim 1 wherein said emulated UART further comprises a means for providing a receive data present status capable of being polled by said host system.

10. The data communication module as recited in claim 1 wherein said emulated UART further comprises a means for notifying said host system of said receive data when said receive data does not exceed a quantity threshold and said receive data has resided in said receive buffer for a stale period of time.

11. An emulated UART for asynchronously transceiving transmit and receive data directly between a host system and a DSP memory of a digital signal processor (DSP), said DSP memory being partitioned into transmit and receive buffers and facilitating direct memory access coordinated by DMA signaling and data pointers visible to both the emulated UART and the DSP, said emulated UART comprising:
   a) a means for directly queuing said transmit data from the host system to said transmit buffer of said DSP memory including
      (i) a means for receiving said transmit data from said host system;
      (ii) a means for temporarily suspending said DSP from accessing said DSP memory; and
      (iii) a means for forwarding said transmit data to said DSP memory;
   b) a means for notifying said host system of said receive data when a quantity of said receive data in said receive buffer exceeds a threshold; and
   c) a means for transferring said receive data upon request directly from the receive buffer of said DSP memory to said host system.

12. The emulated UART as recited in claim 11 further comprising:
   (a) register means for transmit read and transmit write pointers associated with said transmit buffer of said DSP memory; and
   (b) register means for receive read and receive write pointers associated with said receive buffer of said DSP memory.

13. The emulated UART as recited in claim 11 wherein said means for directly queuing said transmit data further comprises a means for prohibiting said host system from transferring said transmit data when said transmit buffer is full.

14. The emulated UART as recited in claim 13 further comprising a means for pacing the rate of transfer of said transmit data from said host system.

15. The emulated UART as recited in claim 11 further comprising a means for interrupting said host system upon the presence of a quantity of said received data in said receive buffer.

16. The emulated UART as recited in claim 11 further comprising a means for providing a receive data a present status capable of being polled by said host system.

17. The emulated UART as recited in claim 11 further comprising a means for notifying said host system of said received data when said receive data doe s not exceed a quantity threshold and said receive data has resided in said receive buffer for a stale period of time.

18. A method for asynchronously transmitting transmit data and receiving receive data between a host system and modem capable of interfacing with a communication network, comprising the steps of:
   a) directly queuing said transmit data from said host system to memory of a digital signal processor (DSP) of said modem, said host system interfacing with said modem through a host interface on said modem that emulates a UART, wherein the step of directly queuing further comprises the steps of:
      (i) receiving said transmit data at said host interface on said modem that emulates the UART;
      (ii) said host interface on said modem that emulates the UART temporarily suspending said DSP from accessing said memory; and
      (iii) said host interface on said modem that emulates the UART forwarding said transmit data to said memory;
   b) said DSP retrieving, processing and transmitting said transmit data directly from said memory of said DSP to said communication network;
   c) said DSP receiving, processing and queuing said receive data into said DSP memory;
   d) when a quantity of said receive data exceeds a quantity threshold, notifying said host system of said receive data via said host interface on said modem that emulates the UART; and
   e) transferring said receive data upon request from said host from said memory of said DSP to said host via said host interface that emulates the UART.

19. The method as recited in claim 18, further comprising the step of:
   partitioning said memory of said DSP into a transmit buffer and a receive buffer.

20. The method as recited in claim 19 wherein said directly queuing step further comprises the step of prohibiting said host system from transferring said transmit data when said transmit buffer is full.

21. The method as recited in claim 20 wherein said queuing step further comprises the step of pacing the rate of transfer of said transmit data from said host system to host interface on said modem that emulates the UART said emulated UART.

* * * * *